United States Patent
Mooney et al.

(10) Patent No.: US 7,840,539 B2
(45) Date of Patent: Nov. 23, 2010

(54) METHOD AND SYSTEM FOR BUILDING A DATABASE FROM BACKUP DATA IMAGES

(75) Inventors: David MacKay Mooney, Toronto (CA); Kelly D. Rodger, Toronto (CA); Michael Roecken, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 11/338,212

(22) Filed: Jan. 24, 2006

(65) Prior Publication Data

US 2007/0174325 A1    Jul. 26, 2007

(51) Int. Cl.
*G06F 7/00* (2006.01)
*G06F 17/00* (2006.01)

(52) U.S. Cl. .................. 707/674; 707/647
(58) Field of Classification Search .............. None
See application file for complete search history.

(56) References Cited

U.S. PATENT DOCUMENTS

| | | | |
|---|---|---|---|
| 5,758,337 A * | 5/1998 | Hammond | 707/6 |
| 5,930,824 A | 7/1999 | Anglin et al. | |
| 5,991,772 A * | 11/1999 | Doherty et al. | 707/202 |
| 6,073,128 A * | 6/2000 | Pongracz et al. | 707/3 |
| 6,424,999 B1 | 7/2002 | Arnon et al. | |
| 6,505,216 B1 | 1/2003 | Schutzman et al. | |
| 6,931,422 B1 | 8/2005 | Gusler et al. | |
| 2002/0107877 A1 | 8/2002 | Whiting et al. | |
| 2003/0163495 A1 | 8/2003 | Lanzatella et al. | |
| 2004/0073582 A1 | 4/2004 | Spiegel | |
| 2004/0139128 A1 | 7/2004 | Becker et al. | |
| 2006/0242205 A1 * | 10/2006 | Schmidt et al. | 707/200 |
| 2007/0027937 A1 * | 2/2007 | McGrattan et al. | 707/204 |

* cited by examiner

*Primary Examiner*—Pierre M Vital
*Assistant Examiner*—Rachel J Lee
(74) *Attorney, Agent, or Firm*—Sawyer Law Group, P.C.

(57) ABSTRACT

Building a database from stored backup data images. In one aspect, an identification of a target image is received, the target image including a copy of a logical storage unit of data from a previous database and description information that describes the previous database. The target image holds a copy of a subset of the data of the previous database. A received list has at least one desired logical storage unit of data from the previous database to be included in a built database. The desired logical storage unit is restored from at least one stored data image to the built database using the description information in the target image. Other aspects include the target image being a database image, and the desired logical storage units of data being a subset of database data.

19 Claims, 4 Drawing Sheets

METHOD AND SYSTEM FOR BUILDING A DATABASE FROM BACKUP DATA IMAGES

FIELD OF THE INVENTION

The present invention relates to computer database systems, and more particularly to building a database from stored backup data images.

BACKGROUND OF THE INVENTION

Database management systems store extensive amounts of organized information for access by users of the systems. In a database system environment, the system responds to specific inquiries from the user as to which data to present from the database. Users can specify classes or types of data to retrieve from the database according to the conditions and criteria of their queries. Typically, users provide queries in a particular syntax of a particular database language that is used by the system, such as Structured Query Language (SQL) format.

The data in a relational database is typically organized in multiple tables or data files, and a logical group of these tables or files are stored in a logical storage unit or logical group of data, referred to herein as a "table space." Each table space stores a subset of the database data and, all together, make up an entire database. In some databases, each table space might be organized to store tables of data that share a common characteristic, classification, or type, while in other databases, table spaces can each store different and varied types of data or data for a variety of uses. For example, one use of table spaces is to have each table space store only the data for one particular user of the database management system.

Database backups are typically performed periodically and routinely to create one or more copies of the database that store its data in safe, secondary storage areas, thus protecting the data of the database from unexpected data loss and errors. If data loss occurs in the active database, the data from a backup can be restored to reconstruct and recover the lost data. A set of backed up data is often referred to as a data "image."

A backup image can include the data from an entire database, or just include the data from one or more individual table spaces of the database. Backups are typically performed at specific times throughout the history of a database, and are typically performed at either database granularity (backup up the entire database) or table space granularity (backing up individual table spaces within the database). Furthermore, some backups are full backups that store all the data in the specified database or table space, while other backups are "incremental" backups that store only some of the data, e.g., only changes made since a previous backup.

One problem in the prior database management systems is that a user cannot build (restore or create) an entire database from a set of table space backup images, i.e., without ever having backed up a full database backup image. There are no existing tools or infrastructure to restore and synchronize multiple individual table space images into an entire database. One reason for this inability to restore the full database is that two different table space backup images are typically backed up at different times, and there is no existing way to restore the individual table spaces to a consistent point in time. For efficiency, many data backups are performed at a table space level, so that this can be a serious limitation; it requires that the system administrator perform full database backups if they wish to restore the entire database at a future date.

Furthermore, it is not possible with existing systems to build a database-level database by restoring only a subset of the database, made up of table spaces. The administrator is required to restore or create the entire database, including all the table spaces, even if the administrator wishes only to restore a subset of the database, such as individual table spaces.

Accordingly, what is needed is the ability to build an entire database from a subset of the database, such as table spaces, as well as the ability to build only a subset of data from a database. The present invention addresses such a need.

SUMMARY OF THE INVENTION

The invention of the present application relates to building a database from stored backup data images. In one aspect of the invention, a method for building a database from stored data images includes receiving an identification of a target image, where the target image includes a copy of at least one logical storage unit of data from a previous database, and description information that describes the previous database. The target image holds a copy of a subset of the data of the previous database. The method includes receiving a list of at least one desired logical storage unit of data to be included in a built database, where at least one desired logical storage unit is from the previous database. At least one desired logical storage unit is restored from at least one stored data image to the built database using the description information in the target image. Similar aspects of the invention are provided for a computer program product comprising a computer readable medium including program instructions for implementing similar features.

In another aspect, a method for building a database from stored data images includes receiving an identification of a target image, where the target image includes a copy of at least one logical storage unit of data from a previous database, and description information that describes the previous database. The target image holds a copy of a subset of the data of the previous database. The method includes receiving a list of at least one desired logical storage unit of data to be included in a database-level built database, where at least one desired logical storage unit is from the previous database and is a subset of data from the previous database. At least one desired logical storage unit is restored from the target image to the built database using the description information in the target image.

In another aspect, a system for building a database from stored data images includes a database for storing a built database, and a data storage that stores a target image, where the target data image includes a copy of a table space of data from a previous database, and description information that describes the previous database. The target image holds a copy of a subset of the data of the previous database. The system also includes a build processor in communication with the database and the data storage, which can receive an identification of the target image and a list of at least one desired table space of data to be included in the built database. At least one desired table space is from the previous database, where the build processor restores the at least one desired table space from a stored data image to the built database using the description information in the target image.

The present invention provides a method and system allowing a user to build or restore an entire database from different backup images, even images from different points in time. An administrator thus need not always perform lengthy full database backups in order to have the ability to restore the entire database in the future. In addition, the present invention allows a subset of an entire database to be restored or created at a database level using any type of backup image, including backup images from different points in time. Thus, administrators can decide on the order in which data subsets, such as table spaces, are restored and recovered, so that critical table spaces can be recovered in a timely manner, and the recovery of less important table spaces can be delayed until time permits.

DETAILED DESCRIPTION

Figure 1:
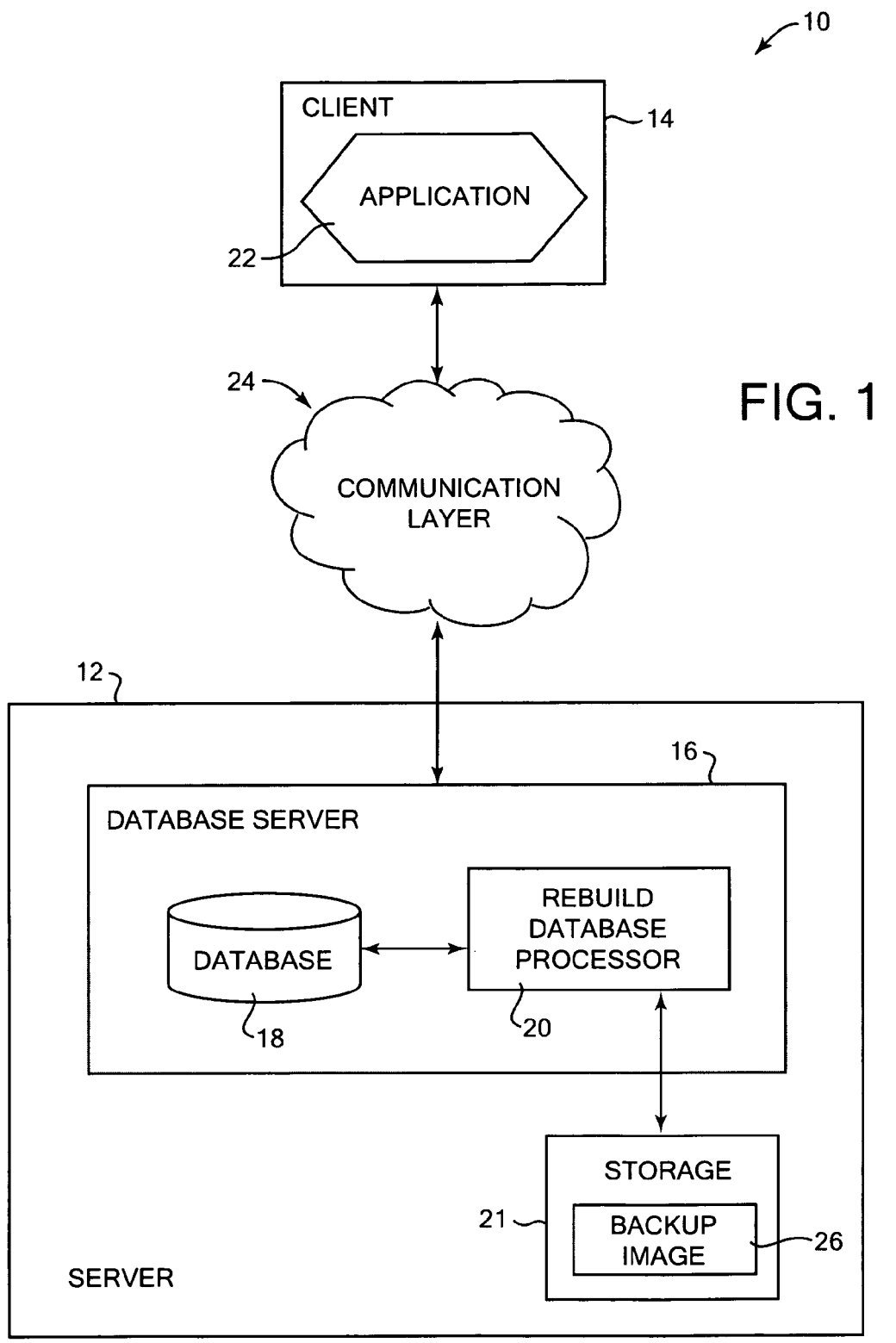
FIG. 1 is a block diagram illustrating a system of the present invention.

The present invention relates to computer database systems, and more particularly to building a database from stored backup data images. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the system implementations usable with the present invention can take a number of different forms. The present invention will also be described in the context of particular methods having certain steps. However, the method and system operate effectively for other methods having different and/or additional steps not inconsistent with the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

To more particularly describe the features of the present invention, please refer to FIGS. 1-5 in conjunction with the discussion below.

FIG. 1 is a block diagram illustrating a system 10 of the present invention. System 10 includes exemplary components, such as a server 12 and a client 14.

Server 12 is implemented as a computer system or electronic device. For example, the server 12 can be a mainframe computer, desktop computer, workstation, portable computer, or electronic device. One or more microprocessors and memory devices (not shown) control the operation of the server, including data manipulation, computation, input/output, and other typical functions.

The server 12 includes one or more database servers 16, which are implemented on the server 12 and performs functions and operations specific to a database system. A database server 16 can include the necessary software to, for example, send and receive appropriate database commands and data, read and write data to a database, allocate space for and organize data, etc. For example, the database server 16 can be implemented based on a known standard, such as DB2 from IBM Corporation, or other database standards.

One or more databases 18 are included in database server 16, where a database 18 is an entity that includes user data as well as information and functions needed to implement the data storage. The database server 16 organizes data in database 18 according to rules and structures as specified by the database creator and administrator. One example of data organization in database 18 is described below with respect to FIG. 2. The storage of data in the database 18 is implemented using one or more storage devices, such as hard disks, magnetic tape, optical storage devices (CD, DVD, etc.), or other types of storage media, one example of which is described below with reference to FIG. 3. In an alternate embodiment, the database 18 can be distributed among multiple computer systems or electronic devices, such as multiple servers 12.

Database server 16 also includes an automatic rebuild database processor 20 ("build processor") of the present invention. Build processor 20 can be implemented as a software unit in the database server 16, and/or as processor hardware and circuitry. The build processor 20 can automatically build a complete or partial database from stored data images according to the method of the present invention, as described in further detail below with respect to FIG. 5.

Data storage 21 can also be implemented in server 12 (in alternate embodiments, the storage 21 can be implemented externally to the server 12). Storage 21 can be, for example, any electronic data storage that can communicate with the database server 16. In the embodiment of FIG. 1, the storage 21 stores one or more backup images 26, which are copies of the entire database 18, or copies of subsets or portions of the database 18, which are stored separately from the database 18 for archival or backup purposes, and which can be restored to the database 18. Changes to the database occurring after the backup date of the restored backup image 26 can also be restored by applying archived and/or online logs, which are records of changes applied to the database at any given time. Backup image 26 may also contain incremental data, which is data resulting from an incremental backup and includes only data that changed relative to a previous backup image. Herein, the term "stored" is often used to refer to the backing up of a backup image 26 in a storage area such as storage 21.

For example, if some data in the database 18 is lost due to a device malfunction or other error, a previous copy of the data stored in storage 21 in the form of a backup image 26 can be restored by retrieving it from storage 21 and writing it over the corresponding data and storage in the database 18 of server 12, and making it available to the database server 16. In some embodiments, the build processor 20 of the database system 16 can retrieve one or more backup images 26 and write them to a different storage area so as to create a new database, rather than writing over the corresponding data in the existing or previous database 18.

Client 14 can be any suitable computer system or electronic device that allows a user (or program) to communicate with the server 12. The client 14 can implement an application 22, which can be a database interface application, for example. The database interface allows the user to input queries to the server 12 and the database server 16, to search for data stored in the database 18 that satisfies the queries, and return that data to the application 22. For example, user access can be provided to the data of the database 18 using a database language, such as Structured Query Language (SQL). In alternate embodiments, interface application 22 can be implemented on the server 12 to allow access to database server 16 for a user.

The communication between client 14 and server 12 (or application 22 and database server 16) is allowed over a communication layer 22, which can include transmission wires, wireless communication devices, internal circuits to the server 12, or any electronic communication medium and mechanism.

Figure 2:
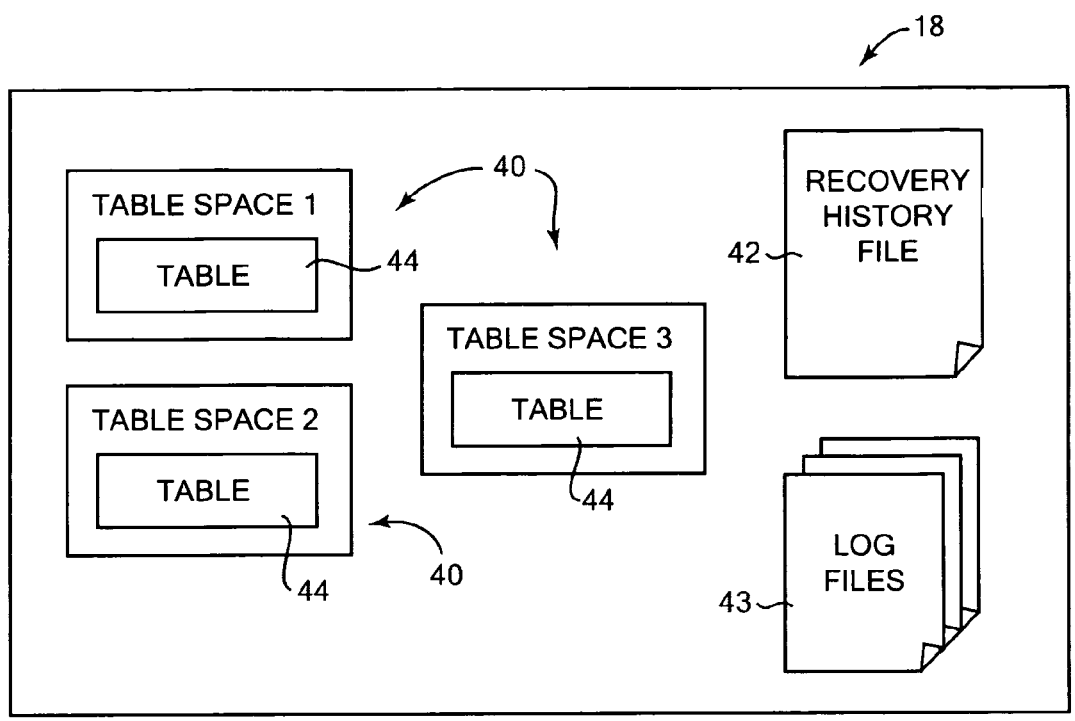
FIG. 2 is a block diagram illustrating a database 18 suitable for use with the present invention.

FIG. 2 is a block diagram illustrating a database 18 suitable for use with the present invention. Database 18 includes one or more table spaces 40, a recovery history file 42, and log files 43.

Database 18 stores data categorized or structured in a predetermined manner. The data of database 18 can be accessed by users and administrators using an application 22 as described above with reference to FIG. 1. Users or other computers or programs may also store additional data in database 18 using an interface to the server and database, such as application 22 or other program or device in communication with the database server 16.

Table spaces 40 are subsets or subsections of data stored within the database 18. Herein, the term "table space" refers to a logical storage unit for data which stores data files in the form of tables or other relational database structures. The term "logical storage unit" is intended to refer generally any collection or group of data within a database, regardless of how it is organized. Although the term "table space" is used as an example throughout this description, any group of data in a database can be used with the present invention. Each table space 40 has an allocated storage area defined for it that can be used to store data, where typically the data in a single table space have characteristics related in some way so that access to the table space is more intuitive. For example, all the data in a particular table space could relate to the personal information for employees of a company, while a different table space could store data related to invoices received by the company.

A table 44 can be provided in each table space 40, where the table 44 stores the data of the table space in an organized structure. For example, a table storing the addresses and phone numbers for company employees can include a separate column for names, addresses, and phone numbers, with each row of the table corresponding to a different employee. There can be one table, or multiple tables 44 stored in each table space 40. Other types of relational structures can alternatively be stored in a table space 40.

Recovery history file 42 is a file of stored data that includes the history of all backups that have been made of the data in database 18 (as well as other database events). Such details as the particular table spaces 40 that were backed up on each occasion, the time and date of each backup event, the type of backup made (incremental or full), and the destination storage space (storage location) of the backups can all be included in the history file 42. The recovery history file 42 can be used to recover a stored backup image, as detailed below with respect to FIG. 5, since the history file 42 has the details as to what data was backed up and when/where it was backed up.

Log files 43 are files storing records of logs of changes made to the database. When the database processes any workload, log records are written in a log file (and written to the next log file 43 when the first log file fills up, etc.). For example, the user may wish to restore the database data to a point in time after the store date of a backup image; to perform this function, the appropriate records from the log files 43 are "replayed" or applied to the database data after the desired backup images have been restored. In some embodiments of the present invention, there may be restored backup images which were stored at different times, and the log files 43 are used to synchronize the restored data so that all the data restored from the images reflects the same point in time. Thus, the logs are replayed for the oldest image, then later images, up to the point in time that the user wishes to recover, and so on for each image. Once all images are synchronized at the table space time, then any additional changes past that point in time can be applied, if desired, by replaying the appropriate logs. In other embodiments, such as for an offline restoration of a non-recoverable database using an entire database image, the user will only restore up to the time of the backup image, and the log files would not be needed.

Figure 3:
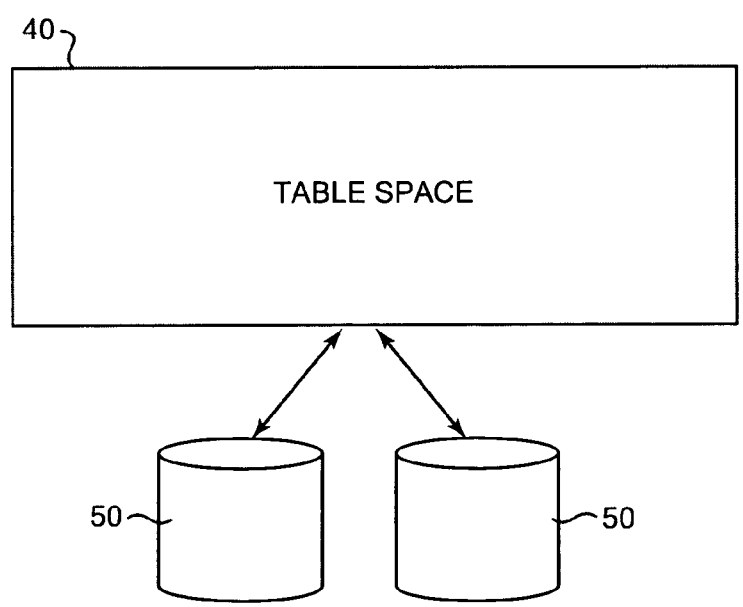
FIG. 3 is a block diagram illustrating one example of data storage implementation for the database of FIG. 1.

FIG. 3 is a block diagram illustrating one example of storage implementation for database 18. The storage capability of storage devices 50 can be used to implement the table spaces 40. Any storage devices can be used, such as hard disks, magnetic tape, optical storage devices (CD, DVD), etc. The allocation of which storage device 50 stores data for which table space 40 is a hardware implementation that varies with different applications, and is well known to those of skill in the art. For example, a single table space 40 can be physically stored on two or more storage devices 50, as shown in FIG. 3, or in another embodiment, can be stored on a single storage device. This physical storage layout can be decided on by the user.

Figure 4:
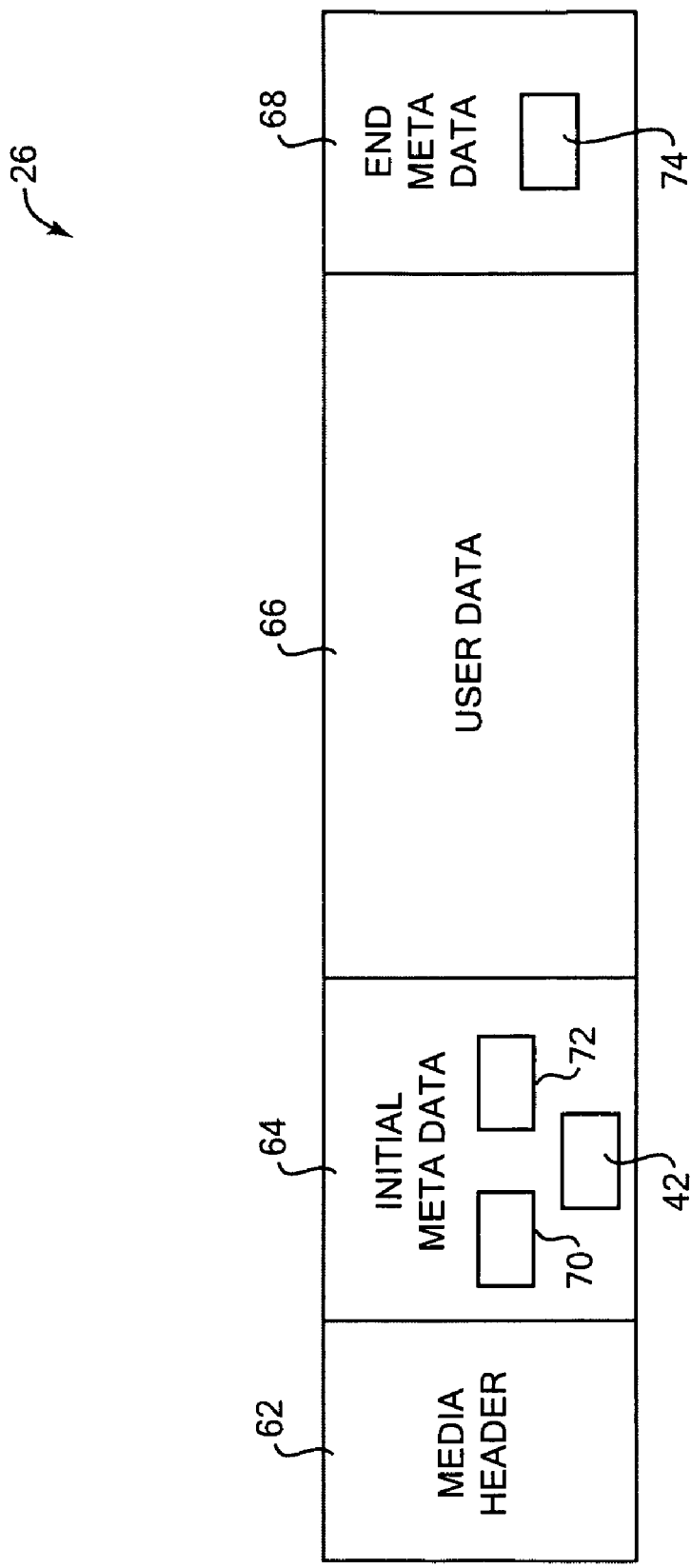
FIG. 4 is a diagrammatic illustration of an example of a backup data image suitable for use with the present invention.

FIG. 4 is a diagrammatic illustration of an example of a backup data image 26 suitable for use with the present invention. Backup image 26 is a copy of data from the database 18 which has been stored separately from the database, e.g., in data storage 21. If backup image 26 stores table space data needed for a restore operation, the data from the image 26 is copied back into the database 18 over its corresponding data, or is copied to another location to create another database.

Backup image 26 is stored as a collection of "objects" (e.g., as one or more files or other units) and divided into several different sections for storing different types of data having different purposes for the image. In the example shown, the image 26 first includes a media header 62, which includes header information indicating the start of the image to a scanning process, a description of the image, and the environment (such as computer or operating system platform, bit size, etc.) to which the database belongs. Following the media header, an initial meta data field 64 holds "description information" related to the database 18 (among other information not relevant to this invention), where the description information includes table space definitions 70, a table space inventory list 72, and a copy of the recovery history file 42.

Table space definitions 70 are configuration data which state the structural layout and the storage requirements for each table space 40 in the database 18, including the table space(s) stored in image 26 in which the definitions are stored, at the time that the backup image 26 was stored. Each table space 40 has its own table space definition included in the definitions 70. Table space definitions 70 indicate how the table spaces 40 are laid out in the database 18, so that any particular table space stored in a backup image 26 can be stored in the correct location and linked to the database in the proper way to recreate the database. The definitions also store information about the recovery points in time, such as consistency points and information related to log transactions (e.g., starting values that mark where replaying of logs would take place from), etc. Table space definitions 70 also state the storage requirements (in terms of data space) for all the table spaces 40, so that a build process knows how much space to allocate for a table space that is to be restored. The table space definitions also indicate where the storage paths are for all the user data of the table spaces 40, including the access path to the table spaces, etc. The current table space definitions 70 are written to each image 26 when each image is backed up; thus, the table space definitions in a particular backup image 26 describe the table space structure of the database 18 at the time that the particular image 26 is stored.

The table space inventory list 72 is a list of all the table spaces 40 in the database (at the point in time when image 26 was stored), and also includes a flag, marker, or other indication for each of the table spaces as to whether that table space has user data that is included in the backup image 26 that stores the list 72. This list is used in the determination of backup images to restore, as described below with reference to FIG. 5. In other embodiments, the data of list 72 can be combined with the table space definitions 70.

As described above, the recovery history file 42 stores backup image information for all the table spaces 40 in the database 18. Whenever a backup is performed from the database 18, one or more entries are written in the recovery history file 42 that indicates when the backup was performed, and which table spaces (user data 66) were backed up in which backup images. Since the history file 42 includes the backup information for all the table spaces 40 of the database, a recovery history file 42 is stored in every image 26 of a table space 40 of the database 18. The recovery history file 42 is accurate up to a time just before the file is backed up by the current image.

User data 66 is the actual copy of data from one or more table spaces 40 as stored in the particular backup image 26. User data 66 can be in the form of tables or other organizations or collections of data. Typically, the data 66 is related to each other in some fashion, so that the image 26 stores a particular type of data or other identifiable collection of data. One backup image 26 may store one or more complete table spaces, or only portions of one or more table spaces 40. If the backup image 26 includes data for an incremental backup, then that incremental user data 66 might only be stored as a portion of data, e.g., as a portion of a table to be added to a previous referenced backup image, or as changes to a referenced table space in a previous backup image.

End meta data field 68 is provided at the end of each image 26 to signify the end of the user data 66 and the end of the image 68. The end meta data field also includes a log file header (LFH) 74, which is a control file for all the log records in log files 43 that make up the database and is thus a snapshot of the state of the database at the time the image is backed up. During a restore operation, the LFH from the oldest restored image is restored, so that after all the backup images are restored, replaying the log files can be performed (if needed) to gain consistency among data from multiple restored backup images, and the LFH from the oldest image provides a correct starting point for the log replays.

Figure 5:
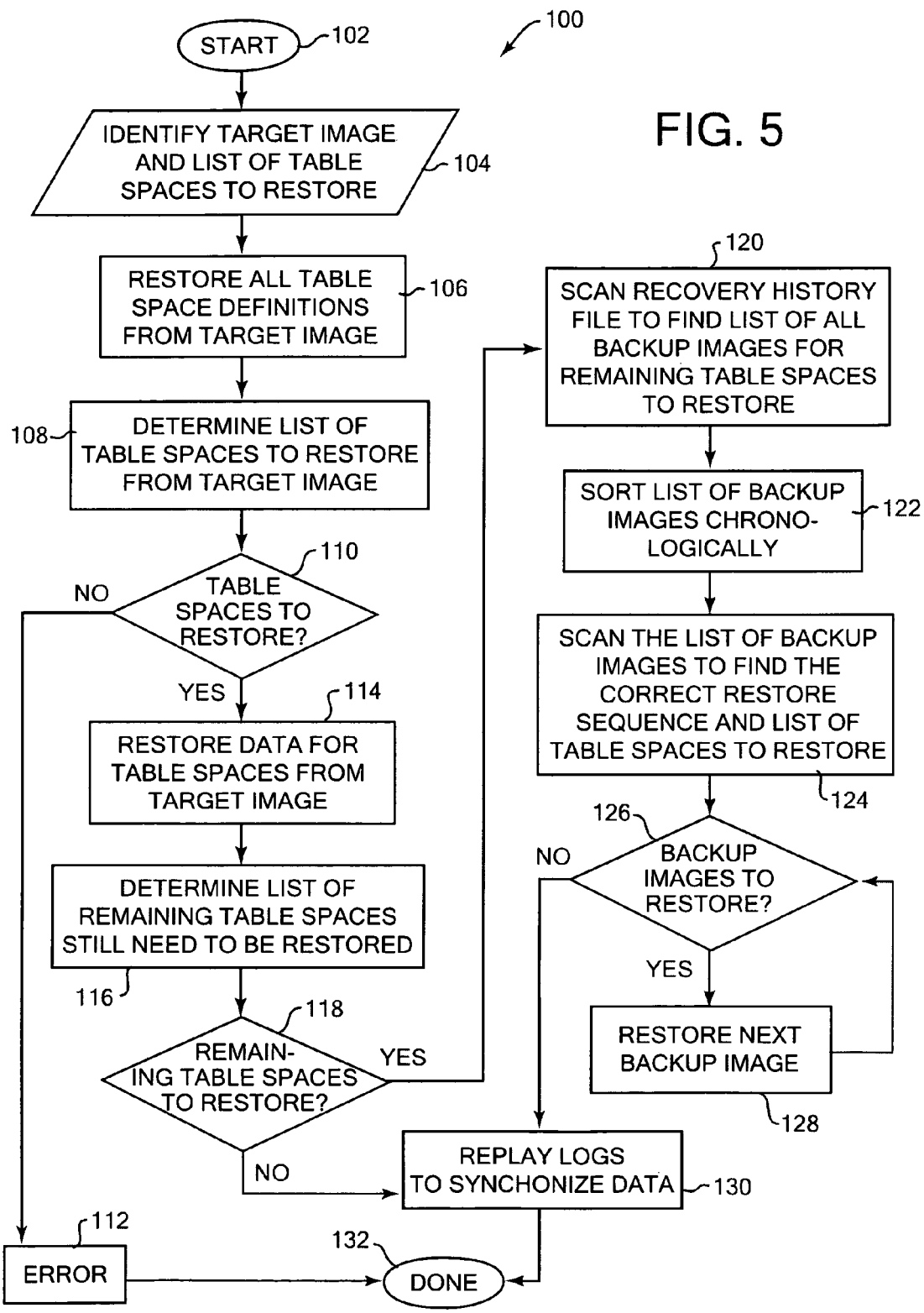
FIG. 5 is a flow diagram illustrating a method of the present invention for building a complete or partial database from backup data images.

FIG. 5 is a flow diagram illustrating a method 100 of the present invention for building a complete or partial database from backup data images. Method 100 can be implemented, for example, on the same computer or electronic device (or one of the computer systems or devices) that implements the database server 16 and database 18. For example, the build processor 20 of the database server of FIG. 1 can implement the method. Method 100 can be implemented by program instructions or code. Program instructions can be stored on a computer readable medium, such as memory, hard drive, other magnetic disk, optical disk (CD or DVD), etc. Alternatively, the method 100 can be implemented in hardware (logic gates, etc.), or in a combination of hardware and software.

The method begins at 102, and in step 104, there is identified a target backup image and a list of table spaces which are desired to include in a built database. The desired built database may be an existing database, where the list of table spaces are intended to be written over the corresponding table spaces in the existing database. Or, the built database can be a new, created database.

In one embodiment, the target image is identified when a user (e.g., user, other software program, etc.) can specify the target image and list of table spaces to the database server 16 and build processor 20, via an application 22 or by other inputs. In another embodiment, a user can input a particular point in time in the past to which the user wishes the database to be built, and the list of desired table spaces, and the method 100 would then automatically find and specify a backup image to use as the target image, e.g., the most recent backup image available, or closest in time and previous to the user's specified point in time.

The target image is a backup image 26 (where the image is collection of data/information objects having all been backed up at the same point in time). The target image, in the described embodiment, includes a copy of at least one of the table spaces 40 from the database 18 which the user is interested in including in the built database. The target image can be an image of the entire database, or an image of a subset of the database (table spaces). The target image was originally stored at a particular date and this image has been chosen by the user as having a desired restoration date, the baseline date for the built database. For example, the user may wish to restore the database (or a subset of table spaces) that existed at a particular desired point in time in the past. Assuming that there are different images of table spaces stored at different points in time in the past, the user preferably selects as the target image a backup image 26 having a store date closest in time before the desired point in time. Thus, if the user wishes to restore the database to its state as it existed two weeks ago, the user would preferably select as the target image the data image backed up before, and closest in time, to the desired time two weeks ago. In other applications, the user could select an image having a backup date further back in time.

The user also identifies a list of table spaces in step 104. This list designates which table spaces 40 the user wishes to include in the built database. Thus, if the user specifies all the table spaces 40, then the entire database 18 will be restored (a complete database). If the user identifies a subset of table spaces 40, then only those tables spaces are restored, creating a partial database. (In some embodiments, the table spaces 40 of the existing/previous database that are not in the list can be made inaccessible after restoration, but need not be deleted from the existing database, in case the user wishes to access them at some later time.) It should be noted that, according to the present invention, the built database results from a "database-level" restore operation. All the configurations and structures of the entire database will be restored for the built database, even when the built database is a partial database having only a subset of the user data from the database. The present invention allows the restoration of an entire database structure having only a subset of the actual data.

Thus, when specifying the target image and list of desired table spaces of step 104, the user has several different options according to the present invention, allowing much greater flexibility in restore operations. For example, the user may specify that the target image is a complete database image, and specify in the list only a subset of the data from the image (resulting in a partial database-level database). Or, the user may specify a target image having only a subset of database data, and specify in the list all the data of the database, resulting in a complete database restored from individual table space images stored at different times. The user may also specify a target image having a subset of data, and specify in the list a subset of data, resulting in a partial database.

In one embodiment, the target image will include a catalog table space of the database, or the list of desired table spaces will specify the catalog table space for inclusion in the built database. The catalog table space is a main table space in the database that includes control information that deals with basic database functionality and is required to use the database, and thus must be included in the built database. If the catalog table space is not included in the target image and is listed in the user's list, then it is restored as a remaining backup image as detailed below. In some embodiments, the catalog table space may not be present in either the target image or the list of desired table spaces; in such a case, the method 100 can be performed as usual, but the resulting built table space will not be accessible by a user until the catalog table space is (later) restored for the database, e.g., in a standard table space restore operation. In another embodiment, the method 100 can automatically halt if no catalog table space is found in the target image and list, and prompt the user for additional confirmation and/or input. In other embodiments, such as when the database is a non-catalog partition, there may be no catalog partition to restore.

In step 106, the process restores all the table space definitions in the initial meta data field 64 of the target image so that they may be used (e.g., the process writes the definitions to the existing database, overwriting the existing definitions). Since they are from the target image, the restored table space definitions describe the table space structure of the database 18 at the time at which the target image was stored.

In step 108, the process determines a list of table spaces from the target image to restore to the built database. These are the table spaces which have user data in the target image and which are included in the list of desired table spaces from step 104. This step includes using the restored table space definitions 70 and the table space inventory list 72 of the initial meta data 64 in the target image and parsing/reducing down the list of table spaces provided by the user in step 104, to those table spaces that have user data in the target image. Those table spaces that have user data in the target image have their table space storage (e.g., in the existing/previous database) acquired and allocated at this time. For example, a user provides in step 104 a target image and a list of five table spaces to restore to the built database, and only three of those table spaces have user data in the target image. The table space definitions for all five table spaces are restored in step 106, and the list generated in step 108 is the result of parsing the five table spaces down to three so that it is known which table space data to restore out of the target image.

In step 110, the process checks whether there are any table spaces to restore resulting from step 108. This is an error checking procedure for the described embodiment that makes sure that at least one table space from the target image is to be restored. If no table spaces are found in the target image which are to be restored, then the process continues to step 112 to implement and/or indicate an error, and the process is complete at 132. In an alternate embodiment, step 110 can be removed, and the target image need not include any table spaces to be restored.

If there are table spaces in the target image to restore, then the process continues to step 114, in which the user data for the table spaces from the target image is restored. The user data 66 is retrieved from the target image and copied to the current database storage in the table space corresponding to the data, or to a newly-allocated or created table space.

It should be noted that if the target image holds incremental backup data, then the table spaces are not restored in step 114, and steps 108, 110, and 114 are skipped, so that the earlier, full base data for the incremental data can be retrieved from an earlier backup image and the incremental changes applied to it in steps 116-128, detailed below.

In step 116, the process determines a list of table spaces which are not included in the target image and which still need to be restored to the built database. These are table spaces identified in the list step 104, which were not in the target image. If the user is restoring the entire database, then the table spaces of step 116 are all of the remaining table spaces in the database besides the restored table spaces of step 114. If the user is restoring only a partial database, then the remaining table spaces are a subset of all remaining table spaces in the database.

In step 118, the process checks if there are any remaining (non-target-image) table spaces to restore. For example, if the user only wishes to restore the table spaces in the target image and no other table spaces, then there will be no more table spaces to restore after step 114; the process then continues to step 130, detailed below. If there are remaining table spaces to restore, then the process continues to step 120, where the process scans the recovery history file 42 of the database 18 to determine a list of all existing stored backup images that include these remaining table spaces. In some cases, there may be multiple similar backup images found in step 120, each of those backup images including data for the same particular table space at a different point in time. The recovery history file was processed as part of the initial meta data 64 in the target image, and after the target image is restored, the history file is up to date, including for the target image. In one embodiment, the history file from the target image is restored to the database 18 only if the existing history file is corrupted, empty, etc. In an alternate embodiment, the history file in the target image is always restored and replaces the existing history file.

In step 122, the process sorts the list of the backup images from step 120 chronologically, based on the time at which those backup images were stored, i.e., from the oldest image to the most-recently stored image. The oldest images are sorted to be first so that any incremental backups can be applied in the proper chronological order, from the oldest image to the newest incremental changes.

In step 124, the process scans the chronologically-ordered list of backup images from step 122 to determine the correct restore sequence and the correct list of table spaces to restore. The correct restore sequence is a sequence that allows the table space allocated storage to be accurately prepared for the restored user data. For example, if incremental backups were performed with one or more of the desired table spaces, those table spaces may need to be modified one or more times with later-stored backup images that include the incremental changes to earlier images. The correct restore sequence is the correct, chronological incremental restore sequence which allows the process to allocate table space storage for the restoration of the incremental images. The allocation of storage space needed for the restored table spaces can be figured by looking at the multiple backup images from an incremental backup, each in turn and in the proper sequence, where the proper order of restoration is provided from oldest image to newest incremental image. To adhere to the required restore sequence across multiple table spaces from different points in time, the table space storage is properly identified in advance, before the actual restoration of steps 126 and 128.

The correct list of table spaces to restore includes those remaining non-target-image table spaces identified in the list provided in step 104, where older versions of (non-incremental) backup images have been discarded in favor of corresponding earlier versions. Redundant incremental images, if any, are discarded as well.

In step 126, the process checks whether there are any remaining backup images to restore to the built database. If so, then the process continues to step 128, where the next backup image in the correct list of backup images from step 124 is restored to the built database. The restoration might include copying the data in the backup image to the database 18 in place of any equivalent data that already exists in the database, or to a new allocation of storage space. When restoring a backup image, only the desired table spaces are requested and restored from the image. The process then returns back to step 126 to check if there is another backup image to restore from the corrected list.

After all the backup images from the list are restored via steps 126 and 128, then the process continues to step 130, where the logs for the restored data are replayed. As explained above, the log files 43 hold records with information that will restore (update) the database past the time of a backup image. The LFH 74 stored in each image includes log file information used in this step to determine the starting point for the replaying of the logs for full restoration. In the present invention, the logs are used to synchronize the data from different backup images. Since the present invention allows images from different times to be combined and used in restoring a database, the data from these images must be synchronized to a consistent point in time, such as the latest image restored. For example, they can be synchronized up to the time of the target image if the target image is the latest image restored. The replaying of the logs updates the data from the images to the time of the latest image. In addition, the logs can be similarly used to update the restored data to a desired point in time after the date of the latest image restored.

The process is then complete at 132.

In one embodiment, the user can be allowed to provide input for several options before step 130 is processed. For example, the user can be asked if he or she wants to restore another table space into the database using the standard table-space level restoration process, before the replay logs are replayed (e.g., this option can be used to restore a catalog table space if it was not already restored). After step 130, when the process is complete and the database has been built, the user can be allowed to connect, or prompted whether they want to connect, to the built database. The user can also restore individual table spaces to the built database at a later time using a standard table-space level restore process, e.g., to restore less critical table spaces when time permits.

The present invention advantageously allows an administrator to restore an entire database using a set of backup data images that were backed up at different points in time. Thus, the entire database can be restored without ever having backed up a full database image at one time in the past. Administrators therefore need not always perform lengthy full database backups, and can restore databases from individual table space backups performed at different times.

The present invention also allows an administrator of a database system to specify a subset of database data, such as particular table spaces, that the administrator wants to include in a built database, and the system will automatically find the desired table spaces of data and restore only those table spaces to a database-level, partial database. This capability is not present in prior systems, in which the entire database with all its data must be restored. Thus, the present invention allows data administrators to decide on the order in which table spaces are restored and recovered for a database-level restoration, so that critical table spaces can be recovered in a timely manner, and the recovery of less important table spaces can be delayed until time permits.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for building a database from stored data images, comprising: receiving an identification of a previously-stored target backup image from any of one or more previously-stored data backup images, wherein the target backup image identifies a previous complete database and includes a copy of at least one table space of data from the previous complete database and description information that describes the previous complete database, wherein the description information includes a set of table space definitions describing a table space structure of the previous complete database;

receiving a list specifying a plurality of desired table spaces of data from the previous complete database to be included in a built database, the list specifying only a subset of the table spaces of the previous complete database;

restoring the desired table spaces from the one or more previously-stored data backup images to create the built database using the description information in the target backup image, the one or more previously-stored data backup images being a backup of the data and not being used in operating the previous complete database, wherein the built database is a partial database including only the subset of table spaces and is a newly-created database including the structure provided for the previous complete database, and wherein restoring the desired table spaces includes using the set of table space definitions in the target backup image to determine a table space structure for the built database, and retrieving and using the description information from the target backup image, at least one of the desired table spaces being included in the target backup image and being restored from the target backup image to the built database, wherein one of the one or more previously-stored data backup images is the target backup image, and wherein a desired point in time of a structure of the built database is equal to a point in time of storage of the target backup image, the target backup image not including all of the desired table spaces for the built database, and wherein the description information retrieved from the target backup image includes a recovery history file describing the one or more previously-stored data backup images that include the desired table spaces, at least one of the previously-stored data backup images including the desired table spaces which are not in the target backup image, a copy of the recovery history file being included in each of the one or more previously-stored data backup images, each copy of the recovery history file describing the target backup image and all of the one or more previously-stored data backup images storing all of the data of the previous complete database, wherein each copy of the recovery history file includes information identifying the following:

a) each of all table spaces of the previous complete database that were stored in corresponding data backup images, b) each of the corresponding data backup images in which each of the table spaces of the previous complete database was stored, and c) each point in time that each of the corresponding data backup images of the previous complete database were backed up; and wherein restoring the desired table spaces includes scanning the recovery history file of the target backup image to determine desired backup images that include the desired table spaces not included in the target backup image, and restoring the desired backup images to the built database.

2. The method of claim 1, wherein at least one of the desired backup images was stored at a different point in time than the target backup image.

3. The method of claim 2, further comprising sorting the desired backup images chronologically into a chronological order according to a time at which they were stored, and wherein the chronological order is included in the restoration of the desired backup images to the built database, the desired backup images being restored one at a time to the built database.

4. The method of claim 1, wherein at least one of the desired backup images includes a copy of incremental data relative to a different previous backup image, the incremental data resulting from an incremental backup of data.

5. The method of claim 3, further comprising replaying log information to update the data restored from the desired backup images and synchronize the data from the desired backup images with the data from the target backup image.

6. The method of claim 1 further comprising restoring a catalog table space from the target backup image or one of the previously-stored data backup images, the catalog table space being a table space of the previous complete database that includes control information that is required to use the built database.

7. A computer program product comprising a computer readable storage medium including program instructions implemented by a computer system for building a database from stored data images, the program instructions for:

receiving an identification of a previously-stored target backup image from any of one or more previously-stored data backup images, wherein the target backup image identifies a previous complete database and includes a copy of at least one table space of data from the previous complete database and description information that describes the previous complete database, wherein the description information includes a set of table space definitions describing a table space structure of the previous complete database;

receiving a list specifying a plurality of desired table spaces of data from the previous complete database to be included in a built database, the list specifying only a subset of the table spaces of the previous complete database;

restoring the desired table spaces from the one or more previously-stored data backup images to create the built database using the description information in the target backup image, the one or more previously-stored data backup images being a backup of the data and not being used in operating the previous complete database, wherein the built database is a partial database including only the subset of table spaces and is a newly-created database including the structure provided for the previous complete database, and wherein restoring the desired table spaces includes using the set of table space definitions in the target backup image to determine a table space structure for the built database, and retrieving and using the description information from the target backup image, at least one of the desired table spaces being included in the target backup image and being restored from the target backup image to the built database, wherein one of the one or more previously-stored data backup images is the target backup image, and wherein a desired point in time of a structure of the built database is equal to a point in time of storage of the target backup image, the target backup image not including all of the desired table spaces for the built database, and wherein the description information retrieved from the target backup image includes a recovery history file describing the one or more previously-stored data backup images that include the desired table spaces, at least one of the previously-stored data backup images including the desired table spaces which are not in the target backup image, a copy of the recovery history file being included in each of the one or more previously-stored data backup images, each copy of the recovery history file describing the target backup image and all of the one or more previously-stored data backup images storing all of the data of the previous complete database, wherein each copy of the recovery history file includes information identifying the following:

a) each of all table spaces of the previous complete database that were stored in corresponding data backup images, b) each of the corresponding data backup images in which each of the table spaces of the previous complete database was stored, and c) each point in time that each of the corresponding data backup images of the previous complete database were backed up; and wherein restoring the desired table spaces includes scanning the recovery history file of the target backup image to determine desired backup images that include the desired table spaces not included in the target backup image, and restoring the desired backup images to the built database.

8. The computer program product of claim 7, wherein restoring the desired table spaces includes scanning the recovery history file of the target backup image to determine desired backup images that include the desired table spaces not included in the target backup image, and restoring the desired backup images to the built database, wherein at least one of the desired backup images was stored at a different point in time than the target backup image, and further comprising sorting the desired backup images chronologically into a chronological order according to a time at which they were stored, wherein the chronological order is included in the restoration of the desired backup images to the built database, the desired backup images being restored one at a time to the built database.

9. The computer program product of claim 7, wherein at least one of the desired backup images includes a copy of incremental data relative to a different previous backup image, the incremental data resulting from an incremental backup of data.

10. The computer program product of claim 8, further comprising replaying log information to update the data restored from the desired backup images and synchronize the data from the desired backup images with the data from the target backup image.

11. The computer program product of claim 7 further comprising restoring a catalog table space from the target backup image or one of the previously-stored data backup images, the catalog table space being a table space of the previous complete database that includes control information that is required to use the built database.

12. A system for building a database from stored data images, the system comprising:

a memory;

a database for storing a built database; data storage that stores a target backup image, wherein the target backup image is any of one or more previously-stored data backup images and identifies a previous complete database and includes a copy of at least one table space of data from the previous complete database and description information that describes the previous complete database, wherein the description information includes a set of table space definitions describing a table space structure of the previous complete database;

a build processor in communication with the database and the data storage, the build processor operative to receive an identification of the target backup image and a list specifying a plurality of desired table spaces of data from the previous complete database to be included in a built database, the list specifying only a subset of the table spaces of the previous complete database, wherein the build processor restores the desired table spaces from the one or more previously-stored data backup images to create the built database using the description information in the target backup image, the one or more previously-stored data backup images being a backup of the data and not being used in operating the previous complete database, wherein the built database is a partial database including only the subset of table spaces and is a newly-created database including the structure provided for the previous complete database, and wherein restoring the desired table spaces includes using the set of table space definitions in the target backup image to determine a table space structure for the built database, and retrieving and using the description information from the target backup image, at least one of the desired table spaces being included in the target backup image and being restored from the target backup image to the built database, wherein one of the one or more previously-stored data backup images is the target backup image, and wherein a desired point in time of a structure of the built database is equal to a point in time of storage of the target backup image, the target backup image not including all of the desired table spaces for the built database, and wherein the description information retrieved from the target backup image includes a recovery history file describing the one or more previously-stored data backup images that include the desired table spaces, at least one of the previously-stored data backup images including the desired table spaces which are not in the target backup image, a copy of the recovery history file being included in each of the one or more previously-stored data backup images, each copy of the recovery history file describing the target backup image and all of the one or more previously-stored data backup images storing all of the data of the previous complete database, wherein each copy of the recovery history file includes information identifying the following:

a) each of all table spaces of the previous complete database that were stored in corresponding data backup images, b) each of the corresponding data backup images in which each of the table spaces of the previous complete database was stored, and c) each point in time that each of the corresponding data backup images of the previous complete database were backed up; and wherein the build processor restores the desired table spaces including scanning the recovery history file of the target backup image to determine desired backup images that include the desired table spaces not included in the target backup image, and restoring the desired backup images to the built database.

13. The system of claim 12, wherein the build processor restores the desired table spaces including scanning the recovery history file of the target backup image to determine desired backup images that include the desired table spaces not included in the target backup image, and restoring the desired backup images to the built database, wherein at least one of the desired backup images was stored at a different point in time than the target backup image, and wherein the build processor sorts the desired backup images chronologically into a chronological order according to a time at which they were stored, wherein the chronological order is included in the restoration of the desired backup images to the built database, the desired backup images being restored one at a time to the built database.

14. The system of claim 12, wherein at least one of the desired backup images includes a copy of incremental data relative to a different previous backup image, the incremental data resulting from an incremental backup of data.

15. The system of claim 13, wherein the build processor replays log information to update the data restored from the desired backup images and synchronize the data from the desired backup images with the data from the target backup image.

16. The system of claim 12 wherein the build processor restores a catalog table space from the target backup image or one of the previously-stored data backup images, the catalog table space being a table space of the previous complete database that includes control information that is required to use the built database.

17. The method of claim 1 wherein a particular past point in time is received from a user to which the user wishes the database to be built, and the identification of the target backup image is not received from the user, and further comprising:

finding and identifying a backup image closest in time to the particular past point in time to be used as the target backup image, such that the identification of the previously-stored target backup image identifies the backup image closest in time to the particular past point in time.

18. The computer program product of claim 7 wherein a particular past point in time is received from a user to which the user wishes the database to be built, and the identification of the target backup image is not received from the user, and further comprising:

finding and identifying a backup image closest in time to the particular past point in time to be used as the target backup image, such that the identification of the previously-stored target backup image identifies the backup image closest in time to the particular past point in time.

19. The system of claim 12 wherein a particular past point in time is received from a user to which the user wishes the database to be built, and the identification of the target backup image is not received from the user, and wherein the build processor finds and identifies a backup image closest in time to the particular past point in time to be used as the target backup image, such that the identification of the previously-stored target backup image identifies the backup image closest in time to the particular past point in time.

* * * * *